United States Patent [19]
Gornowicz et al.

[11] Patent Number: 6,153,691
[45] Date of Patent: Nov. 28, 2000

[54] THERMOPLASTIC SILICONE VULCANIZATES PREPARED BY CONDENSATION CURE

[75] Inventors: Gerald Alphonse Gornowicz; Hongxi Zhang, both of Midland, Mich.

[73] Assignee: Dow Corning Corporation, Midland, Mich.

[21] Appl. No.: 09/167,337

[22] Filed: Oct. 7, 1998

[51] Int. Cl.[7] ..................................... C08J 83/05
[52] U.S. Cl. .................. 524/861; 525/100; 525/106; 525/431; 525/453
[58] Field of Search .................. 525/100, 106, 525/431, 453; 524/861

[56] References Cited

U.S. PATENT DOCUMENTS

| | | | |
|---|---|---|---|
| Re. 33,070 | 9/1989 | Arkles | 525/431 |
| 3,627,836 | 12/1971 | Getson | 260/825 |
| 3,865,897 | 2/1975 | Falender | 260/827 |
| 3,888,815 | 6/1975 | Bessmer et al. | 524/703 |
| 3,969,308 | 7/1976 | Penneck | 260/37 |
| 4,695,602 | 9/1987 | Crosby | 524/439 |
| 4,714,739 | 12/1987 | Arkles | 525/92 |
| 4,775,712 | 10/1988 | Sasaki | 524/504 |
| 4,803,244 | 2/1989 | Umpleby | 525/105 |
| 4,831,071 | 5/1989 | Ward | 524/401 |
| 4,849,469 | 7/1989 | Crosby | 524/439 |
| 4,888,390 | 12/1989 | Liang | 525/189 |
| 4,891,407 | 1/1990 | Mitchell | 525/104 |
| 4,970,263 | 11/1990 | Arkles | 525/92 |
| 5,051,478 | 9/1991 | Puydak | 525/195 |
| 5,391,594 | 2/1995 | Romenesko | 523/212 |
| 5,556,908 | 9/1996 | Chung | 524/493 |
| 5,604,288 | 2/1997 | Furukawa | 524/493 |
| 5,648,426 | 7/1997 | Zolotnitsky | 525/100 |

FOREIGN PATENT DOCUMENTS

| | | | |
|---|---|---|---|
| 410888 | 1/1991 | European Pat. Off. | |
| 506465 | 9/1992 | European Pat. Off. | |
| 651009 | 5/1995 | European Pat. Off. | |
| 2 757 528 | 6/1998 | France | C08L 83/04 |
| 62-121752 | 11/1985 | Japan | |
| 62-11897 | 1/1987 | Japan | |
| 63-219147 | 9/1988 | Japan | |
| 115450 | 5/1991 | Japan | |
| 5-59287 | 3/1993 | Japan | |
| 26147 | 1/1995 | Japan | |
| 08337698 | 12/1996 | Japan | |
| 96/01291 | 1/1996 | WIPO | |

*Primary Examiner*—Margaret G. Moore
*Attorney, Agent, or Firm*—Alex Weitz

[57] ABSTRACT

There is disclosed a method for preparing a thermoplastic elastomer, said method comprising:

(I) first mixing
  (A) a thermoplastic resin selected from polyolefins, polyamides, thermoplastic polyurethanes or styrenic block copolymers,
  (B) at least one silanol-terminated diorganopolysiloxane having a viscosity of at least 10 Pa-s at 25° C.,
  (C) optionally, up to 300 parts by weight of a filler for each 100 parts by weight of said diorganopolysiloxane, said filler being selected from the group consisting of
    (i) a reinforcing filler for said diorganopolysiloxane and
    (ii) a silicone resin,
  (D) an organohydrido silicon compound which contains an average of at least 2 silicon-bonded hydrogen groups in its molecule and
  (E) a condensation catalyst, components (D) and (E) being present in an amount sufficient to cure said diorganopolysiloxane; and
(II) dynamically curing said diorganopolysiloxane (B).

22 Claims, No Drawings

THERMOPLASTIC SILICONE VULCANIZATES PREPARED BY CONDENSATION CURE

FIELD OF THE INVENTION

The present invention relates to thermoplastic elastomer compositions wherein a silicone diorganopolysiloxane is dispersed in a thermoplastic resin and dynamically vulcanized therein. More particularly, the invention relates to such a thermoplastic elastomer wherein the silicone component contains silanol functionality and is cured with an SiH-functional crosslinker in the presence of particular condensation catalysts.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms, but it has been shown that the use of a non-specific catalyst, such as an organic peroxide, can also result in at least a partial cure of the thermoplastic resin itself, thereby reducing or completely destroying ability to re-process the composition (i.e., it no longer is a thermoplastic elastomer). In other cases, the peroxide can lead to the partial degradation of the thermoplastic resin. To address these problems, elastomer-specific crosslinkers, such as organohydrido silicon compounds, can be used to cure alkenyl-functional elastomers.

Arkles, in U.S. Pat. No. 4,500,688, discloses semi-interpenetrating networks (IPN) wherein a vinyl-containing silicone fluid having a viscosity of 500 to 100,000 cS is dispersed in a conventional thermoplastic resin. Arkles only illustrates these semi-IPNs at relatively low levels of silicone. The vinyl-containing silicone is vulcanized in the thermoplastic during melt mixing according to a chain extension or crosslinking mechanism which employs a silicon hydride-containing silicone component. This dsclosure is expanded by Arkles in U.S. Pat. No. 4,714,739 to include the use of hybrid silicones which contain unsaturated groups and are prepared by reacting a hydride-containing silicone with an organic polymer having unsaturated functionality. In U.S. Pat. No. 4,970,263, Arkles et al. further extend the above concepts to systems wherein the semi-IPN is crosslinked by hydrolysis of alkoxysilyl groups on the polymer network. The product is said to have improved chemical resistance and mechanical properties as well as excellent temperature resistance and electrical properties.

In a copending application to Gornowicz et al. entitled "Thermoplastic Silicone Elastomers" (Ser. No. 09/034,089), we also teach the preparation of TPSiVs wherein silicone gum is dispersed in an organic resin and subsequently dynamically vulcanized therein via a hydrosilation cure system. Under certain conditions, such systems were shown to have significantly improved mechanical properties over the corresponding simple blends of resin and silicone gum in which the gum was not cured. Unfortunately, only polyolefin or poly(butylene teraphthalate) resins were suitable and attempts to prepare a similar TPSiV based on other resins proved unsuccessful, mechanical properties of the dynamically vulcanized system being comparable to those of the corresponding simple blend. Moreover, many resins may contain groups that can "poison" (i.e., inactivate) the platinum catalyst used to promote the hydrosilation reaction. Moreover, some resins contain residual unsaturation (e.g., styrene-butadiene-styrene, styrene-isoprene-styrene) which would react with the SiH-functional cure agent in the above mentioned systems, thereby depleting this crosslinker and potentially crosslinking the resin itself.

Thus, although the above cited publications disclose the preparation of thermoplastic elastomer compositions using various thermoplastic resins as the matrix and a dispersed silicone phase which is dynamically vulcanized therein, neither these publications, nor any art known to applicants, teach TPSiVs wherein the silicone is cured by a condensation reaction which is not sensitive to the above mentioned poisoning phenomenon.

SUMMARY OF THE INVENTION

It has now been discovered that various organic thermoplastic resins can be used as the matrix in a TPSiV wherein a silicone component is cured via a condensation reaction between a silanol-functional silicone fluid or gum and an organohydrido silicon crosslinker. Surprisingly, we have found that when this condensation reaction is catalyzed by a platinum species, the resulting TPSiV has poor processing characteristics and/or poor mechanical properties relative to a similar system wherein the catalyst is selected from metal carboxylate, amine or quaternary ammonium compounds. The compositions of the present invention also show a significant improvement in mechanical properties relative to a corresponding simple blend wherein the silicone component is not cured, as in the case of systems disclosed in the above cited application to Gornowicz et al. This is, of course, of great commercial significance since the vulcanization procedure, and the cure agents required therefor, add to both the complexity as well as the expense of the preparation and vulcanization would be avoided in many applications if essentially identical mechanical properties could be obtained without its employ.

The present invention, therefore, relates to a method for preparing a thermoplastic elastomer, said method comprising:

(I) first mixing
  (A) a thermoplastic resin selected from polyolefins, polyamides, thermoplastic polyurethanes or styrenic block copolymers,
  (B) at least one diorganopolysiloxane having an average of at least 2 silanol groups in its molecule,
  (C) optionally, up to 300 parts by weight of a filler for each 100 parts by weight of said diorganopolysiloxane, said filler being selected from the group consisting of
    (i) a reinforcing filler for said diorganopolysiloxane and
    (ii) a silicone resin,
  (D) an organohydrido silicon compound which contains an average of at least 2 silicon-bonded hydrogen groups in its molecule and
  (E) a platinum-free condensation catalyst, components (D) and (E) being present in an amount sufficient to cure said diorganopolysiloxane; and (II) dynamically curing said diorganopolysiloxane (B), wherein the amount of said diorganopolysiloxane (B) used is such that at least one property of the thermoplastic elastomer selected from tensile strength or elongation is at least 25% greater than the respective property for a corresponding blend wherein said diorganopolysiloxane is not cured and said thermoplastic elastomer has an elongation of at least 25%.

The invention further relates to a thermoplastic elastomer which is prepared according to the above described method.

DETAILED DESCRIPTION OF THE INVENTION

Component (A) of the present invention is a thermoplastic resin or a thermoplastic elastomer selected from polyolefins, polyamides, thermoplastic polyurethanes or thermoplastic styrenic block copolymers, or a blend of two or more such systems. This component must have a melt point ($T_m$) or glass transition temperature ($T_g$) above room temperature (RT) but must not be crosslinked. Thus, although it is a solid under normal ambient conditions, it readily flows upon the application of a shearing stress when heated above its melt point or glass transition temperature (i.e., melt flow).

Suitable polyamide resins are exemplified by nylon 66, nylon 12, nylon 46, nylon 610 and nylon 6.

Polyolefin resin may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4-methylpentene-1, pentene-1, octene-1, nonene-1 and decene-1, inter alia. These polyolefins can be prepared using peroxide, Ziegler-Natta or metallocene catalysts, as well known in the art. Interpolymers of two or more of the above mentioned olefins may also be employed as component (A) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

The polyolefin may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Preferred polyolefins include polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. Preferably, these systems have a density of about 0.85 to 0.97 g/cc, more preferably 0.875 to 0.930 g/cc, and weight average molecular weight of about 60,000 to about 1,000,000.

Other preferred polyolefins include polypropylene (PP) resins, such as atactic, syndiotactic or isotactic PP. These are typically homopolymers of propylene or interpolymers of propylene with minor proportions of ethylene. Such PP systems can have the ethylene polymerized randomly with propylene units or a number of ethylene units may be linked to form a block copolymer.

Thermoplastic elastomeric styrenic block copolymers of the invention are exemplified by styrene-butadiene-styrene block copolymers (SBS), styrene-ethylene-butylene-styrene copolymers (SEBS), styrene-isoprene-styrene copolymers (SIS), hydrogenated versions of the above, and the like. Specific commercial representatives include such resins as KRATON® D1102 and KRATON® FG1901X from Shell.

Thermoplastic polyurethanes comprise urethane hard segments and polyesters or polyether soft segments. Specific commercial embodiments include PELLETHANE™ (Upjohn), ESTANE™ (Goodrich), SPANDEX™ (DuPont) and TEXIN™ (Mobay), inter alia.

It has, however, been found that various other resins will not form the desired TPSiV according to the instant method. For example, polyester resins tend to crosslink under the dynamic vulcanization conditions, described infra. Use of polystyrene as component (A) results in compositions having very poor mechanical integrity.

Diorganopolysiloxane (B) is a fluid or gum having a viscosity of at least 10 Pa-s at 25° C. which is terminated with silanol (i.e., —SiOH) groups. The silicon-bonded organic groups of component (B) are independently selected from hydrocarbon or halogenated hydrocarbon groups. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; alkenyl groups having 2 to 20 carbon atoms, such as vinyl, allyl and hexenyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane has a glass transition temperature (or melt point) which is below room temperature such that this component forms an elastomer when cured, as described infra. Methyl preferably makes up at least 85, more preferably at least 90, mole percent of the silicon-bonded organic groups in component (B).

Thus, polydiorganosiloxane (B) can be a homopolymer, a copolymer or a terpolymer containing such organic groups. Examples include fluids or gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B) include: dimethylhydroxysiloxy-endblocked dimethylsiloxane homopolymers; dimethylhydroxysiloxy-endblocked methylphenylsiloxane-dimethylsiloxane copolymers; and dimethylhydroxysiloxy-endblocked methylphenylpolysiloxanes. Preferred systems for low temperature applications include silanol-functional methylphenylsiloxane-dimethylsiloxane copolymers and diphenylsiloxane-dimethylsiloxane copolymers, particularly wherein the molar content of the dimethylsiloxane units is about 93%.

Component (B) may also consist of combinations of two or more organopolysiloxane fluids or gums. Most preferably, component (B) is a polydimethylsiloxane homopolymer which is terminated with a silanol group at each end of the molecule.

Preferably, the molecular weight of the diorganopolysiloxane is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 $cm^3$ in volume and approximately 10 mm in height after the specimen has been subjected to a compressive load of 49 Newtons for three minutes at 25° C. Although there is no absolute upper limit on the plasticity of component (B), practical considerations of processability in conventional mixing equipment generally restrict this value. Preferably, the plasticity number should be about 100 to 200, most preferably about 120 to 185. We have found that such gums can readily be dispersed in resin (A) without the need for filler (C), described infra.

It has, however, been found that fluid diorganopolysiloxanes having a viscosity of about 10 to 100 Pa-s at 25° C. often can not be readily dispersed in the thermoplastic resin (A). Under these circumstances, the fluid must be mixed with up to about 300 parts by weight of filler (C), described infra, for each 100 parts by weight of (B) in order to facilitate dispersion. Preferably, the fluid and filler are mixed before adding this combination to resin (A), but these can be added seperately.

Methods for preparing the above described fluid and high consistency silanol-containing polydiorganosiloxanes are well known and many such hydroxyl-terminated silicones are available commercially.

Filler (C) is selected from (i) reinforcing fillers or (ii) silicone resins. When (B) is a gum having a plasticity of at least 30, this filler is an optional component which can often enhance mechanical properties of the resulting TPSiV. But, as alluded to above, inclusion of this filler is generally required when the diorganopolysiloxane is a fluid having a viscosity less than about 100 Pa-s in order to disperse the latter in component (A). In this case, up to about 300 parts by weight of the filler (C) is used for each 100 parts by weight of diorganopolysiloxane (B).

Component (i) can be any filler which is known to reinforce diorganopolysiloxane (B) and is preferably selected from finely divided, heat stable minerals such as fumed and precipitated forms of silica, silica aerogels and titanium dioxide having a specific surface area of at least about 50 $m^2$/gram. The fumed form of silica is a preferred reinforcing filler based on its high surface area, which can be up to 450 $m^2$/gram and a fumed silica having a surface area of 50 to 400 $m^2$/g, most preferably 200 to 380 $m^2$/g, is highly preferred. When used, reinforcing filler (i) is added at a level of about 20 to 200 parts by weight, preferably 20 to 150 and most preferably 20 to 100 parts by weight, for each 100 parts by weight of component (B).

If a fumed silica filler is employed, it is preferably treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated (i.e., silanol) diorganopolysiloxane having an average degree of polymerization (DP) of 2 to about 100, more preferably about 2 to about 10 and it is used at a level of about 5 to 50 parts by weight for each 100 parts by weight of the silica filler. When component (B) is the preferred silanol-functional polydimethylsiloxane, this treating agent is preferably a hydroxy-terminated polydimethylsiloxane.

Silicone resin (ii) is a soluble organopolysiloxane consisting essentially of $R_3SiO_{1/2}$ siloxane units (M units) and $SiO_{4/2}$ siloxane units (Q units). By the term "soluble" it is meant that the organopolysiloxane can be dissolved, substantially completely, in either a hydrocarbon liquid such as benzene, toluene, xylene, heptane and the like or in a silicone liquid such as cyclic or linear polydiorganosiloxanes. Preferably the resin is technologically compatible with component (B). In the above formula, R denotes a monovalent radical independently selected from the group consisting of hydrocarbon and halogenated hydrocarbon radicals having fewer than 20 carbon atoms, preferably 1 to 10 carbon atoms. Examples of suitable R radicals include alkyl radicals, such as methyl, ethyl, propyl, pentyl, octyl, undecyl and octadecyl; cycloalphatic radicals, such as cyclohexyl; aryl radicals such as phenyl, tolyl, xylyl, benzyl and 2-phenylethyl; alkenyl radicals such as vinyl; and chlorinated hydrocarbon radicals such as 3-chloropropyl and dichlorophenyl. The silicone resins, also referred to as "MQ resins," are well known in the art and further description thereof is considered unnecessary. They may be prepared, for example, by the silica hydrosol capping process of Daudt, et al., U.S. Pat. No. 2,676,18. Such resins typically also contain from about 0.5 to 4 weight percent silanol functionality wherein the latter group replaces some of the R groups in the above described M and Q units.

To enhance the compatibility of component (ii) in component (B), it is desirable to select the predominant R radicals of the former to match the organic radicals of diorganopolysiloxane (B). Preferably, at least one-third, and more preferably substantially all R radicals of resin (ii) are methyl radicals. The methyl radicals can be distributed in any desired arrangement among the $R_3SiO_{1/2}$ siloxane units; however, it is preferred that each $R_3SiO_{1/2}$ siloxane unit bear at least one, and more preferably at least two, methyl radicals. Examples of preferred $R_3SiO_{1/2}$ siloxane units include $Me_3SiO_{1/2}$, $PhMe_2SiO_{1/2}$ and $Ph_2MeSiO_{1/2}$ where Me hereinafter denotes methyl and Ph hereinafter denotes phenyl. Preferred MQ resins have an M to Q ratio of 0.4 to 1.1, a number average molecular weight of 2,000 to 15,000 and a polydispersity of 1.0 to 6.0.

When used, silicone resin (ii) is added at a level of about 20 to 300 parts by weight, preferably 25 to 200 and most preferably 50 to 150 parts by weight, for each 100 parts by weight of component (B).

Both the reinforcing fillers and the silicone resins are well known in the art and further description thereof is not considered necessary.

The organohydrido silicon compound (D) is a crosslinker (cure agent) for diorganopolysiloxane (B) of present composition and is an organopolysiloxane which contains at least 2 silicon-bonded hydrogen atoms in each molecule, but having at least about 0.2 weight percent hydrogen, preferably 0.2 to 2 and most preferably 0.5 to 1.7 percent hydrogen bonded to silicon. Those skilled in the art will, of course, appreciate that either component (D) or component (C), or both, must have a functionality greater than 2 if diorganopolysiloxane (B) is to be cured (i.e., the sum of these functionalities must be greater than 4 on average). The position of the silicon-bonded hydrogen in component (D) is not critical, and it may be bonded at the molecular chain terminals, in non-terminal positions along the molecular chain or at both positions. The silicon-bonded organic groups of component (D) are independently selected from any of the hydrocarbon or halogenated hydrocarbon groups described above in connection with diorganopolysiloxane (B), including preferred embodiments thereof. The molecular structure of component (D) is also not critical and is exemplified by straight-chain, partially branched straight-chain, branched, cyclic and network structures, linear polymers or copolymers being preferred, and this component should be effective in curing component (B).

Component (D) is exemplified by the following:
low molecular siloxanes, such as $PhSi(OSiMe_2H)_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and
silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units.

Particularly preferred organohydrido silicon compounds are polymers or copolymers with R'HSiO units ended with either $R'_3SiO_{1/2}$ or $HR'_2SiO_{1/2}$, wherein R' is independently selected from alkyl radicals having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhdridosiloxy groups.

Component (D) may also be a combination of two or more of the above described systems. The organohydrido silicon compound (D) is used at a level such that the molar ratio of SiH therein to SiOH in component (B) is about 0.5 to 10, preferably 1 to 5 and most preferably about 1.5.

These SiH-functional materials are well known in the art and many of them are commercially available.

In general, the condensation catalyst (E) of the present invention is any compound which will promote the condensation reaction between the SiOH groups of diorganopolysiloxane (B) and the SiH groups of organohydrido silicon compound (D) so as to cure the former by the formation of —Si—O—Si— bonds. However, as noted above, catalyst (E) can not be a platinum compound or complex since the use of such a condensation catalyst often results in poor processing as well as poor physical properties of the resulting TPSiV.

Examples of suitable catalysts include metal carboxylates, such as dibutyltin diacetate, dibutyltin dilaurate, tin tripropyl acetate, stannous octoate, stannous oxalate, stannous naphthanate; amines, such as triethyl amine, ethylenetriamine; and quaternary ammonium compounds, such as benzyltrimethylammoniumhydroxide, beta-hydroxyethylltrimethylammonium-2-ethylhexoate and beta-hydroxyethylbenzyltrimethyldimethylammoniumbutoxide (see, e.g., U.S. Pat. No. 3,024,210).

In addition to the above mentioned major components (A) though (E), a minor amount (i.e., less than 50 weight percent of the total composition) an optional additive (F) can be incorporated in the TPSiV compositions of the present invention. This optional additive can be illustrated by, but are not limited to, extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as halogenated hydrocarbons, alumina trihydrate, magnesium hydroxide, organophosphorous compounds and other fire retardant (FR) materials. These additives are typically added to the final TPSiV composition after dynamic cure, but they may also be added at any point in the preparation provided they do not interfere with the dynamic vulcanization mechanism.

According to the method of the present invention, the thermoplastic elastomer is preferably prepared by thoroughly dispersing diorganopolysiloxane (B), and optionally component (C), in thermoplastic (A) and then dynamically vulcanizing the diorganopolysiloxane using organohydrido silicon compound (C) and catalyst (E). Mixing is carried out in any device which is capable of uniformly dispersing the components in the resin, such as an internal mixer or a twin-screw extruder, the latter being preferred for commercial preparations. Mixing temperature is preferably kept as low as practical consistent with good mixing so as not to decompose the resin. Order of mixing is not critical and, for example, components (B) and (C) can be separately introduced. However, components (B) through (D) should be well dispersed in thermoplastic (A) before catalyst (E) is added and dynamic vulcanization begins. Preferably, (C) is dispersed in (B) and this blend is blended with the thermoplastic resin before the dynamic vulcanization step. Optimum temperatures, mixing times and other conditions of the mixing operation depend upon the particular resin and other components under consideration and these may be determined by routine experimentation by those skilled in the art.

In a first preferred mixing procedure, thermoplastic resin (A) is first melted in an internal mixer at a controlled temperature which is just above the melt point to about 100° C. above the melt point of the resin and a master blend of components (B) through (D) is mixed in for about 2 to 10 minutes. Thus, for example, this range is from the respective melt point of the resin to about 200° C. for PP and PE and up to about 250° C. for Nylon 12. The master blend can be prepared by mixing diorganopolysiloxane (B) with organohydrido silicon compound (D), filler (C), when used, and any optional inhibitors, stabilizers, plasticizers or other additives for component (B), this mixing being carried out, e.g., on a two-roll mill at room temperature. When a preferred diorganopolysiloxane gum, as described supra is used, a mixture thereof with filler and various additives is known as a rubber base in the silicone rubber art, and the cure agent (D) may be included therein or it may be added just prior to dynamic vulcanization. When a thermoplastic elastomer having a low durometer (i.e., softer) is desired, about 10 to 50 parts by weight of a non-functional diorganopolysiloxane fluid having a viscosity of about 10,000 to 100,000 mPa-s at 25° C. per 100 parts by total weight of components (B) and (C) may be included in the silicone base. As the master blend is introduced, the viscosity of the composition increases, then decreases and finally levels off. Once a uniform dispersion of components (A) through (D) has been obtained, catalyst (E) is added and the viscosity again increases, and then levels off, as mixing is continued and the silicone is dynamically vulcanized for a time sufficient to again establish a steady state melt viscosity, typically about 1 to 30 minutes.

In a second preferred embodiment, the above described master blend (i.e., components (B), (D) and optionally (C)) is introduced to the mixer and the thermoplastic resin is then added and the system dynamically cured using catalyst (E), as above.

In a third preferred embodiment, the above mixing is carried out in a twin-screw extruder wherein resin (A) is fed to the extruder through a hopper and components (B) through (E) are introduced into the extruder, with the catalyst (E) being separately fed in at a location furthest downstream. In a variation of this procedure, the filler is introduced along with the resin through the hopper. Preferably, the extruder size is sufficient to accomplish the mixing and curing in one pass.

As noted above, in order to be within the scope of the present invention, the tensile strength or elongation, or both, of the TPSiVs must be at least 25% greater than that of a corresponding simple blend. A further requirement of the invention is that the TPSiV has at least 25% elongation, as determined by the test described infra. In this context, the term "simple blend" denotes a composition wherein the weight proportions of thermoplastic resin (A), diorganopolysiloxane (B) and filler (C), if used, are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. Three such samples are evaluated and the middle value is selected for comparison of tensile and elongation. This value is then compared to the corresponding middle value of a sample prepared from the simple blend composition. It has been observed that when the level of the silicone component is too low, at least a 25% improvement in tensile and/or elongation over the simple blend is not realized and there is no benefit derived from the dynamic vulcanization. Although the range of diorganopolysiloxane consistent with this requirement depends upon the particular thermoplastic resin and other components selected, it is preferred to use about 25% to 75%, more preferably 25 to 60%, of thermoplastic resin (A) based on the total weight of components (A) through (E). However, the upper limit of silicone content is determined by processability considerations since too high a level results in at least a partially crosslinked composition. This limit is the highest level of components (B) and (C), when used, which allows the TPSiV to be readily processed by conventional plastic operations such as molding and extrusion. A thermoplastic elastomer of the present invention which has been re-processed in this manner typically has mechanical properties which are approximately the same as those of the initial TPSiV.

The thermoplastic elastomer prepared by the above described method can then be processed by conventional techniques, such as extrusion, vacuum forming, injection molding, blow molding or compression molding, to fabricate plastic parts. Moreover, these compositions can be re-processed (recycled) with little or no degradation of mechanical properties.

The novel thermoplastic elastomers of the present invention can be used for wire and cable insulation, sealing, automotive and appliance components, belts and hoses, construction seals, bottle closures and general rubber applications.

EXAMPLES

The following examples are presented to further illustrate the compositions and methods of this invention, but are not to be construed as limiting the invention, which is delineated in the appended claims. All parts and percentages in the examples are on a weight basis and all measurements were obtained at 25° C., unless indicated to the contrary.

The following materials, listed alphabetically for ease of reference, were employed in the examples.

BASE 1 is a blend of RESIN 1 and PDMS 2, both described infra, in a weight ratio of 55:45.

BASE 2 is a uniform blend of 59.7 parts of PDMS 1, described infra, 10.2 parts of a silanol terminated polydimethylsiloxane fluid having a viscosity of about 0.04 Pa-s and having about 4 weight percent silicon-bonded hydroxyl radicals, 27.8 parts of a silica having a surface area of 370–380 $m^2/g$ (CAB-O-SIL™ S-17D; Cabot Corp.) and 2.4 parts of a dimethylvinyl terminated fluid having 124 dimethylsiloxane units and 38 methylvinylsiloxane units.

CATALYST 1 is a 0.62% platinum complex of 1,3-diethenyl-1,1,3,3-tetramethyldisiloxane; 7.4% tetramethyldivinyldisiloxane; 92% dimethylvinyl ended polydimethylsiloxane and 0.6% dimethylcyclopolysiloxanes having 6 or greater dimethylsiloxane units.

CATALYST 2 is dibutyltin dilaurate (95% purity) obtained from Aldrich Chemical Co., Milwaukee, Wis.

HTA is a blend of 50% of a hydroxy-terminated polydimethylsiloxane gum having a plasticity of about 165 and 50% cerium hydrate.

NYLON is Nylon 12 having density of 1.01 and melt point of 178° C., purchased from Scientific Polymer Products, Inc., Ontario, N.Y.

PDMS 1 is a hydroxyl-terminated (i.e., silanol terminated) polydimethylsiloxane gum having a Williams plasticity number of 152.

PDMS 2 is a hydroxyl-terminated (silanol) linear polydimethylsiloxane fluid having a viscosity of 50 Pa-s.

PE is a low density polyethylene (LDPE) resin 5004IM having a melt index of 4 and marketed by Dow Chemical Co., Midland, Mich.

PP is a polypropylene resin, Escorene™ 3445, having a melt index of 35, a melt point of 150° C. and marketed by Exxon, Houston, Tex.

RESIN 1 is a resinous organosiloxane copolymer powder consisting essentially of $(CH_3)_3SiO_{1/2}$ and $SiO_2$ units with a molar ratio of $(CH_3)_3SiO_{1/2}:SiO_2$ units of about 0.71 and having about 3 weight percent of hydroxyl groups. Prepared by spray drying a 40% solution of the copolymer in hexamethyldisiloxane.

SBS is a styrene-butadiene-styrene block copolymer, KRATON™ D1102, marketed by Shell, Houston, Tex.

X-LINKER 1 is an SiH-functional crosslinker consisting essentially of 65.6% MeHSiO units, 32.3% $Me_2SiO$ units and 1.8% $Me_3SiO_{1/2}$ units.

Sample Preparation and Testing

Preparation of thermoplastic elastomers of the invention, and Comparative examples, was carried out in a 60 ml Haake internal mixer equipped with sigma blades. In a typical procedure, and unless otherwise indicated, the thermoplastic resin was added to the pre-heated mixer and melted for about 2 to 3 minutes, the diorganopolysiloxane and filler (or silicone base) and crosslinker were added and mixed for about 5 minutes, whereupon catalyst was added and mixing was continued for about 10 minutes to allow dynamic vulcanization of the silicone component, generally at a blade speed of about 100 rpm and a temperature of 180° C. for Nylon and PP and 150° C. for PE and SBS. The SiH/SiOH mole ratio was maintained at a level of about 1.5 to 2.0.

After a given thermoplastic elastomer was prepared according to the above procedure, the composition was compression molded for about 5 minutes (at 200° C. for Nylon and PP and 175° C. for PE and SBS) and cold pressed at room temperature for another 2 minutes to provide slabs having a thickness of about 2 mm. These slabs were stored at room temperature for at least 16 hours and were then cut into dumbbells using an ASTM (American Society for Testing Materials) die having a test length of 25.4 mm and test width of 3.2 mm. Three such samples were tested by a method similar to ASTM D 412 using a Sintech™ machine (MTS Systems, Corp., Research Triangle Park, N.C.) at a test speed of 50 mm/min for nylon, PP and PE and at 500 mm/min for SBS. Nominal tensile strength (i.e., based on the initial cross-sectional area) and elongation at break was reported for the sample having the middle tensile value. In some cases, the tensile force at 100% and 200% elongation was also reported.

Durometer was determined using a Shore A (soft) test instrument (Shore Instrument & Mfg., New York, N.Y.).

Processing Evaluation

The processability of the resulting TPSiVs was rated according to the following criteria:

Poor=composition crumbles in mixer or becomes layered or broken after hot pressing.

Fair=composition exhibits some integrity (banding) in mixer; it can be compression molded into a slab which has a rough surface and irregular flashings.

Good=composition forms a continuous, banded melt in the mixer; it can be compression-molded to produce a uniform slab.

Example 1A

NYLON was mixed with PDMS 1, X-LINKER 1 and CATALYST 2. There was an immediate increase in mixing torque upon addition of the catalyst indicating curing of the silicone component; mixing was continued for 15 minutes. The mixture showed good processabiltiy.

Example 2A

NYLON was mixed with a 55/45 blend of RESIN 1/PDMS 2 and, after 3 minutes, X-LINKER 1 was added. CATALYST 2 was added 3 minute later and an increase in torque was again observed. The mixture was dynamically cured for 10 minutes to provide a composition having good processabiltiy.

Example 3A

The above mixing procedure was varied wherein PDMS 2 was introduced first, followed by NYLON three minutes later. This combination was mixed for 6 minutes, whereupon RESIN 1 and X-LINKER were added. CATALYST 2 was then added after a total mixing time of 18 minutes and increase in torque was observed. Dynamic cure was continued for 10 more minutes. The dynamically cured mixture showed good processabiltiy.

Table 1 summarizes the formulations and test results of the above examples based on NYLON thermoplastic resin.

TABLE 1

| Example | 1A | 2A | 3A |
| --- | --- | --- | --- |
| Composition | | | |
| NYLON | 40 | 40 | 30 |
| PDMS 1 | 60 | 0 | 0 |
| BASE 1 | 0 | 60 | 0 |
| RESIN 1 | 0 | 0 | 20 |
| PDMS 2 | 0 | 0 | 50 |
| X-LINKER 1 | 0.60 | 5.00 | 8.33 |
| CATALYST 1 | 0 | 0 | 0 |
| CATALYST 2 | 0.2 | 0.2 | 0.2 |
| Properties | | | |
| Tensile, MPa | 3.48 | 7.66 | 3.76 |
| Elongation, % | 44 | 34 | 48 |
| Processability | good | good | good |

(Comparative) Example 1B

PP, PDMS 1 and X-LINKER 1 were mixed and dynamically cured in the presence of a platinum catalyst (CATALYST 1), as indicated in Table 2. The cured mixture had poor melt integrity in mixer and a compression molded slab was too weak to test. The formulation and mechanical properties are presented in Table 2, below.

Examples 2B–7B

PP, PDMS 1 and X-LINKER 1 were mixed and dynamically cured with CATALYST 2 catalyst. These mixtures showed good melt flow.

(Comparative) Example 8B

PP was melted for 3 minutes and mixed with PDMS 1 and X-LINKER 1 for 10 minutes to form a 40/60 simple blend (i.e., no dynamic cure). Although this blend had good processability, it showed reduced elongation relative to a similar formulation wherein the silicone gum was cured (Example 4B).

The formulation and mechanical properties of Examples 2B through 8B based on PP are also presented in Table 2.

TABLE 2

| Example | 1B | 2B | 3B | 4B | 5B | 6B | 7B | 8B |
|---|---|---|---|---|---|---|---|---|
| Composition | | | | | | | | |
| PP | 40 | 20 | 30 | 40 | 50 | 60 | 70 | 40 |
| PDMS 1 | 60 | 80 | 70 | 60 | 50 | 40 | 30 | 60 |
| X-LINKER 1 | 0.6 | 0.8 | 0.7 | 0.6 | 0.5 | 0.4 | 0.3 | 0.6 |
| CATALYST 1 | 0.1 | 0 | 0 | 0 | 0 | 0 | 0 | 0 |
| CATALYST 2 | 0 | 0.2 | 0.2 | 0.2 | 0.2 | 0.2 | 0.2 | 0 |
| Properties | | | | | | | | |
| Processing | Poor | Fair | Good | Good | Good | Good | Good | Good |
| Tensile, MPa | — | 1.19 | 1.99 | 3.79 | 7.67 | 9.48 | 14.62 | 4.35 |
| Elongation, % | — | 74 | 56 | 88 | 100 | 72 | 50 | 47 |
| Shore A hardness | — | 60 | 77 | 93 | 95 | 96 | 96 | 86 |

(Comparative) Example 9B

PP was melted for 3 minutes and mixed with a blend of PDMS 1, RESIN 1, X-LINKER 1 and HTA for 5 minutes, as indicated in Table 3. Platinum catalyst (CATALYST 1) was then added and mixing continued for another 12 minutes. The mixture showed poor processing and was too weak to test.

(Comparative) Example 10B

PP was melted for 3 minutes and mixed with BASE 1 composition for 3 minutes before adding X-LINKER 1. CATALYST 1 was added 7 minutes later and mixing continued for another 10 minutes. The mixture showed some integrity in mixer, but the compression molded sample was layered and exhibited a lack of mechanical integrity (i.e., readily crumbled). (Table 3).

Examples 11B–15B

PP was melted, mixed with a masterbatch of PDMS 1, RESIN 1 and X-LINKER 1. This combination was then dynamically cured using CATALYST 2. The cured mixtures showed excellent melt flow performance and their mechanical properties were generally better than those of corresponding TPSiVs which did not include RESIN 1, based on elongation and tensile strength.

The formulation and mechanical properties of the above comparative examples, as well as Examples 11B through 15B based on PP are presented in Table 3.

TABLE 3

| Example | 9B | 10B | 11B | 12B | 13B | 14B | 14B | 15B |
|---|---|---|---|---|---|---|---|---|
| Composition | | | | | | | | |
| PP | 40 | 40 | 20 | 30 | 40 | 50 | 60 | 70 |
| PDMS 1 | 42 | 0 | 58.8 | 51.5 | 44.1 | 36.8 | 29.4 | 22.1 |
| RESIN 1 | 21 | 0 | 17.7 | 15.4 | 13.2 | 11.0 | 8.8 | 6.6 |
| HTA | 1.2 | 0 | 0 | 0 | 0 | 0 | 0 | 0 |
| BASE 1 | 0 | 60 | 0 | 0 | 0 | 0 | 0 | 0 |
| X-LINKER 1 | 3.0 | 10.9 | 3.5 | 3.1 | 2.7 | 2.2 | 1.8 | 1.3 |
| CATALYST 1 | 0.1 | 0.5 | 0 | 0 | 0 | 0 | 0 | 0 |
| CATALYST 2 | 0 | 0 | 0.2 | 0.2 | 0.2 | 0.2 | 0.2 | 0.2 |
| Properties | | | | | | | | |
| Processing | Poor | Poor | Fair | Good | Good | Good | Good | Good |
| Tensile, MPa | — | — | 3.20 | 3.02 | 4.51 | 8.07 | 11.27 | 15.00 |
| Elongation, % | — | — | 188 | 92 | 104 | 128 | 114 | 136 |
| Shore A hardness | — | — | 64 | 83 | 93 | 96 | 95 | 96 |

Examples 16B–18B

PP was melted and mixed with the components shown in Table 4 and dynamically cured with CATALYST 2. The mixtures showed good processing and resulting samples had fair mechanical properties.

TABLE 4

| Example | 16B | 17B | 18B |
|---|---|---|---|
| Composition | | | |
| PP | 30 | 30 | 20 |
| BASE 2 | 70 | 41.1 | 42.7 |
| PDMS 2 | 0 | 0 | 25.6 |
| BASE 1 | 0 | 24.7 | 0 |
| X-LINKER 1 | 1.4 | 4.1 | 1.7 |
| CATALYST 2 | 0.1 | 0.1 | 0.1 |
| Properties | | | |
| Processing | Good | Good | Good |
| Tensile, MPa | 3.51 | 4.37 | 3.19 |
| Elongation, % | 96 | 99 | 95 |
| Shore A hardness | 90 | 98 | 85 |

(Comparative) Example 1C

A simple blend (i.e., no dynamic cure) of PE and PDMS 1 was prepared and tested, as shown in Table 5.

Examples 2C–4C

Similar compositions to (Comparative) Example 1C were prepared wherein CATALYST 2 was employed to dynamically cure the silicone component (Table 5). The TPSiV (Example 2C) having the identical composition to the above described simple blend (but with cure catalyst) was observed to have significantly improved mechanical properties relative to those of (Comparative) Example 1C.

TABLE 5

| Example | 1C | 2C | 3C | 4C |
|---|---|---|---|---|
| Composition | | | | |
| PE | 50 | 50 | 30 | 30 |
| PDMS 1 | 50 | 50 | 70 | 42.2 |
| BASE 1 | 0 | 0 | 0 | 25.3 |
| X-LINKER 1 | 0.5 | 0.5 | 0.7 | 2.5 |
| CATALYST 2 | 0 | 0.2 | 0.2 | 0.2 |
| Properties | | | | |
| Processing | Good | Good | Fair | Good |
| Tensile, MPa | 3.72 | 5.44 | 2.79 | 2.48 |
| Elongation, % | 46 | 172 | 206 | 177 |
| Shore A hardness | 84 | 91 | 75 | 73 |

(Comparative) Example 1D

One hundred 100 parts of PDMS 1 were mixed with 1 part of X-LINKER 1 at 25° C. on a mill for 10 minutes (Masterbatch 1). SBS was melted at 150° C. for 3 minutes and mixed with a Masterbatch 1 for 10 minutes to form a simple blend (i.e., unvulcanized), as shown in Table 6. This blend had good processability but poor mechanical properties (Table 6).

(Comparative) Example 2D

A similar blend to that of Example 1D was dynamically cured using CATALYST 1, as indicated in Table 6. The resulting composition had poor melt flow and very poor mechanical properties (Table 6).

Example 3D

A similar blend to that of Example 1D was dynamically cured for 12 minutes using CATALYST 2, as indicated in Table 6. This TPSiV exhibited good processability and improved mechanical properties relative to the simple blend and the TPSiV which was cured using the platinum catalyst (CATALYST 1) (see Table 6).

Examples 4D–9D

A blend of RESIN 1/PDMS 2/X-LINKER 1 in a weight ratio 75/25/15, respectively, was prepared by mixing the PDMS 1 and X-LINKER 1 with a 72% solution of RESIN 1 in xylene. The solvent was removed under vacuum at 120° C. for 15 hours (Masterbatch 2). SBS was melted on the Haake mixer at 150° C. for 3 minutes, mixed with Masterbatch 1 and Masterbatch 2 for 5 minutes and then dynamically crosslinked for 12 minutes using CATALYST 2, component amounts being presented in Table 6. These TPSiVs showed good processability and generally superior mechanical properties relative to Examples 1D and 2D.

TABLE 6

| Example | 1D | 2D | 3D | 4D | 5D | 6D | 7D | 8D | 9D |
|---|---|---|---|---|---|---|---|---|---|
| Book# 13682 | 51-1 | 50-1 | 49-1 | 49-2 | 49-3 | 49-4 | 49-5 | 49-6 | 49-7 |
| Composition | | | | | | | | | |
| SBS | 40 | 40 | 40 | 40 | 40 | 40 | 40 | 40 | 40 |
| Masterbatch 1 | 60 | 60 | 60 | 54 | 48 | 42 | 36 | 30 | 24 |
| Masterbatch 2 | 0 | 0 | 0 | 6 | 12 | 18 | 24 | 30 | 36 |
| CATALYST 1 | 0 | 0.1 | 0 | 0 | 0 | 0 | 0 | 0 | 0 |
| CATALYST 2 | 0 | 0 | 0.3 | 0.3 | 0.3 | 0.3 | 0.3 | 0.3 | 0.3 |
| Properties | | | | | | | | | |
| Processing | Good | Poor | Good | Good | Good | Good | Good | Good | Good |
| Tensile, MPa | 0.32 | 0.18 | 1.32 | 1.32 | 2.19 | 4.42 | 3.75 | 3.37 | 3.11 |
| Elongation, % | 434 | 188 | 655 | 471 | 937 | 1437 | 1145 | 1130 | 471 |
| Shore A hardness | 18 | 16 | 38 | 35 | 38 | 42 | 45 | 43 | 53 |

From the above examples, it can be seen that the TPSiVs prepared according to the method of the present invention have both improved processing characteristic and superior mechanical properties relative to similar systems wherein silanol-functional diorganopolysiloxanes are cured using an SiH-functional siloxane in the presence of a platinum catalyst. Moreover, it can also be seen that these compositions have significantly improved mechanical properties relative to simple blends of the thermoplastic resin and silicone wherein the latter is not cured.

That which is claimed is:

1. A method for preparing a thermoplastic elastomer, said method comprising:
    (I) first mixing
        (A) a thermoplastic resin selected from polyolefins, polyamides, thermoplastic polyurethanes or styrenic block copolymers,
        (B) at least one silanol-terminated diorganopolysiloxane having a viscosity of at least 10 Pa-s at 25° C.,
        (C) optionally, up to 300 parts by weight of a filler for each 100 parts by weight of said diorganopolysiloxane, said filler being selected from the group consisting of
            (i) a reinforcing filler for said diorganopolysiloxane and
            (ii) a silicone resin,
        (D) an organohydrido silicon compound which contains an average of at least 2 silicon-bonded hydrogen groups in its molecule and
        (E) a platinum-free condensation catalyst, components (D) and (E) being present in an amount sufficient to cure said diorganopolysiloxane; and
    (II) dynamically curing said diorganopolysiloxane (B), wherein the amount of said diorganopolysiloxane (B) used is such that at least one property of the thermoplastic elastomer selected from tensile strength or elongation is at least 25% greater than the respective property for a corresponding blend wherein said diorganopolysiloxane is not cured and said thermoplastic elastomer has an elongation of at least 25%.

2. The method according to claim 1, wherein said diorganopolysiloxane is a gum having a plasticity of at least 30.

3. The method according to claim 2, wherein at least 85 mole percent of the organic groups of said diorganopolysiloxane are methyl and said organohydrido silicon compound is selected from the group consisting of a polymer consisting essentially of methylhydridosiloxane units and a copolymer consisting essentially of dimethylsiloxane units and methylhydridosiloxane units, said organohydrido silicon compound having 0.5 to 1.7 weight percent hydrogen bonded to silicon.

4. The method according to claim 1, wherein said catalyst is a tin carboxylate.

5. The method according to claim 1, wherein said thermoplastic resin is present at a level of 25 to 75 percent based on the total weight of components (A) through (E).

6. The method according to claim 1, wherein the mixing and curing steps are conducted in a twin-screw extruder.

7. The method according to claim 1, wherein said thermoplastic resin is a nylon resin.

8. The method according to claim 1, wherein said thermoplastic resin is selected from the group consisting of polyethylene resins and polypropylene resins.

9. The method according to claim 1, wherein said thermoplastic resin is selected from the group consisting of styrene-butadiene-styrene block copolymers, styrene-ethylene-butylene-styrene copolymers and styrene-isoprene-styrene copolymers.

10. The method according to claim 1, wherein said thermoplastic resin is a thermoplastic polyurethane.

11. The method according to claim 1, wherein said diorganopolysiloxane is a fluid having a viscosity of 10 to 100 Pa-s at 25° C., at least 85 mole percent of the organic groups thereof being methyl, and wherein, for each 100 parts by weight of said diorganopolysiloxane, said filler is selected from the group consisting of (i) 20 to 200 parts by weight of a silica and (ii) 20 to 300 parts by weight of a resin consisting essentially of $Me_3SiO_{1/2}$ and $SiO_{4/2}$ units.

12. A thermoplastic composition prepared by the method of claim 1.

13. A thermoplastic composition prepared by the method of claim 2.

14. A thermoplastic composition prepared by the method of claim 3.

15. A thermoplastic composition prepared by the method of claim 4.

16. A thermoplastic composition prepared by the method of claim 5.

17. A thermoplastic composition prepared by the method of claim 6.

18. A thermoplastic composition prepared by the method of claim 7.

19. A thermoplastic composition prepared by the method of claim 8.

20. A thermoplastic composition prepared by the method of claim 9.

21. A thermoplastic composition prepared by the method of claim 10.

22. A thermoplastic composition prepared by the method of claim 11.

* * * * *